(12) United States Patent
Pautler et al.

(10) Patent No.: US 9,822,038 B1
(45) Date of Patent: Nov. 21, 2017

(54) CHEMICALLY INERT CONCRETE COMPOSITION

(71) Applicant: Magneco/Metrel, Inc., Addison, IL (US)

(72) Inventors: Dominic Pautler, Ellis Grove, IL (US); Michael W. Anderson, West Chicago, IL (US); Lara Binz, Volo, IL (US); Daniel Snyder, Winfield, IL (US)

(73) Assignee: Magneco/Metrel, Inc., Addison, IL (US)

( * ) Notice: Subject to any disclaimer, the term of this patent is extended or adjusted under 35 U.S.C. 154(b) by 0 days.

(21) Appl. No.: 15/279,204

(22) Filed: Sep. 28, 2016

(51) Int. Cl.
 *C04B 28/18* (2006.01)
 *C04B 111/20* (2006.01)

(52) U.S. Cl.
 CPC ........... *C04B 28/18* (2013.01); *C04B 2111/20* (2013.01)

(58) Field of Classification Search
 CPC .................... C04B 28/18; C04B 2111/20
 See application file for complete search history.

(56) References Cited

U.S. PATENT DOCUMENTS

| | | |
|---|---|---|
| 3,751,195 A | 8/1973 | Snow |
| 5,735,947 A | 4/1998 | Hopkins |
| 7,771,529 B1 | 8/2010 | McPherson |
| 7,954,549 B2 | 6/2011 | Lende et al. |
| 8,137,454 B2 | 3/2012 | McPherson |
| 8,480,802 B2 | 7/2013 | McPherson |
| 8,618,006 B2 | 12/2013 | Pattillo |
| 2007/0072957 A1* | 3/2007 | Noguchi .............. A61K 6/0017 523/116 |
| 2009/0298972 A1 | 12/2009 | Galvan-Cazeres |

FOREIGN PATENT DOCUMENTS

| | | | |
|---|---|---|---|
| CN | 103030359 A | * | 4/2013 |
| CN | 103146301 A | * | 6/2013 |

* cited by examiner

*Primary Examiner* — Anthony J Green
(74) *Attorney, Agent, or Firm* — Maxwell J. Petersen; Lewis Brisbois Bisgaard & Smith LLP

(57) ABSTRACT

A chemically inert concrete composition includes, based on dry weight, about 50% to about 95% by weight glass particles and about 3% to about 40% by weight colloidal silica particles. Optional additional chemically inert ingredients can be included in amounts of about 3% to about 40% by weight. The concrete composition is substantially or totally free of Group I and Group II metal oxides, exclusive of the glass particles, and is substantially or totally free of cement.

18 Claims, No Drawings

CHEMICALLY INERT CONCRETE COMPOSITION

FIELD OF THE INVENTION

This invention is directed to a concrete composition, and method of providing a concrete layer, that provides two-way chemical inertness. The concrete composition is chemically inert to the user and surrounding environment during application and before drying, and remains chemically inert after drying.

BACKGROUND OF THE INVENTION

Portland cement is the most common type of cement in general use around the world. Portland cement is composed essentially of compounds of lime (CaO) mixed with silica ($SiO_2$) and alumina ($Al_2O_3$). The lime is typically obtained from a calcareous (lime-containing) raw material, and the silica and alumina are typically obtained from an argillaceous (clay) material.

Due primarily to the presence of lime, Portland cement is caustic, and can cause chemical burns to the user's skin. The powder can cause irritation and prolonged exposure can cause lung cancer. Additional environmental concerns include high energy consumption needed to mine, manufacturer and transport the cement, and the related air pollution resulting from the release of $CO_2$, dioxin, $NO_x$, $SO_2$, and particulates.

U.S. Pat. No. 8,137,454 to McPherson discloses a cement composition that includes at least 60% by weight fine and/or coarse glass aggregate. The composition is used for high density, low porosity sheet forming materials where low hydraulic permeability and high compressive and tensile strength are desired. In addition to the glass aggregate, the cement composition includes required amounts of conventional cement (e.g. Portland cement or white cement) and pozzolans. The described Portland cement has a CaO content of 65% by weight. The described pozzolans include wollastonite having a CaO content of 48% by weight and ground granulated blast furnace slag having a CaO content of 39% by weight. Similar cement compositions are disclosed in U.S. Pat. No. 7,771,529 and U.S. Pat. No. 8,480,802, both to McPherson.

There is a need or desire for a concrete composition that is both environmentally safe and chemically inert, and is useful in a wide variety of corrosive environments.

SUMMARY OF THE INVENTION

The present invention is directed to a chemically inert concrete composition and a method of providing a chemically inert concrete. The concrete composition is chemically inert to the user and surrounding environment during application and before drying. After drying, the concrete is chemically inert to a wide variety of acidic, basic, and other corrosive environments.

The concrete composition is prepared in a slurry form, using aqueous colloidal silica dispersion as the carrier. The concrete composition includes, based on dry weight, about 50% to about 95% by weight glass particles and about 3% to about 40% by weight colloidal silica particles. The concrete composition may also include about 3% to about 40% by weight additional $SiO_2$ and $Al_2O_3$ present in various forms, including without limitation fused silica, flint clay, mullite, and other compounds and combinations thereof, which may be in the form of particles or fibers.

The concrete composition is substantially or totally free of Group I and Group II metal oxides exclusive of the glass particles. The concrete composition is substantially or totally free of cement, which typically contains Group I and/or Group II metal oxides and other reactive ingredients. The chemical inertness of the concrete composition is thus achieved by minimizing or excluding reactive ingredients.

The chemically inert concrete is provided by mixing an aqueous colloidal silica dispersion that includes colloidal silica particles and water, with a quantity of glass particles, to provide the concrete composition. The concrete composition is then applied to a substrate and dried, to provide the chemically inert concrete. The substrate can be a mold, a flat surface, a round or curved surface, such as exist in chemical plants, oil refineries, pulp and paper plants, wastewater treatment plants, sulfur pits, acid sumps, floors, roofs, drains, gutters, pipes, sewers, trenches, and other corrosive environments.

With the foregoing in mind, it is a feature and advantage of the inventor to provide a relatively inexpensive, environmentally friendly, chemically inert concrete composition that is easy to apply and use in a wide variety of corrosive environments and other applications.

It is also a feature and advantage of the invention to provide an environmentally friendly, chemically inert concrete using non-hazardous solid ingredients and water, and excluding reactive solid ingredients and organic carriers.

The foregoing and other features and advantages will be further apparent from the following detailed description of the invention.

DETAILED DESCRIPTION OF THE INVENTION

The chemically inert, environmentally friendly concrete composition includes, based on dry weight, about 50% to about 95% by weight glass particles, suitably about 60% to about 90% by weight glass particles. The glass particles can be made from pulverized recycled glass, or originally manufactured glass, or a combination thereof. The glass particles can be formed of any type of glass, including without limitation soda-lime glass, lead glass, borosilicate glass, fused silica glass, alkali-free glass, and the like. Examples of typical glass compositions are shown in Table 1 below.

TABLE 1

Exemplary Glass Compositions % By Weight)

| Component | Soda-Lime Glass | Lead Glass | Borosilicate Glass | Fused Silica Glass | Alkali-Free Glass |
|---|---|---|---|---|---|
| $SiO_2$ | 63-81 | 60-70 | 60-80 | 100 | 35-70 |
| $Al_2O_3$ | 0-2 | — | 1-5 | — | 5-15 |
| MgO | 0-6 | — | 0-9 | — | 0-2 |
| CaO | 7-14 | 0-1 | 0-2.5 | — | 5-14 |
| $Li_2O$ | 0-2 | — | 0-1.5 | — | — |
| $Na_2O$ | 9-15 | 7-10 | 3-9 | — | — |
| $K_2O$ | 0-1.5 | 6-8 | 0-2 | — | — |
| $Fe_2O_3$ | 0-0.6 | — | — | — | — |
| $Cr_2O_3$ | 0-0.2 | — | — | — | — |
| $MnO_2$ | 0-0.2 | — | — | — | — |
| $Co_3O_4$ | 0-0.1 | — | — | — | — |
| $TiO_2$ | 0-0.8 | — | — | — | — |
| $SO_3$ | 0-0.2 | — | — | — | — |
| Se | 0-0.1 | — | — | — | — |
| $ZrO_2$ | — | 1-3 | — | — | 0-2 |
| PbO | — | 8-25 | — | — | — |
| $B_2O_3$ | — | — | 8-25 | — | 5-15 |

TABLE 1-continued

Exemplary Glass Compositions % By Weight)

| Component | Soda-Lime Glass | Lead Glass | Borosilicate Glass | Fused Silica Glass | Alkali-Free Glass |
|---|---|---|---|---|---|
| BaO | 0.0.2 | — | 0-1 | — | 1-36 |
| SrO | — | — | — | — | 0-5 |

While many of the glass compositions contain Group I and/or Group II metal oxides, these components are stable when present in the glass matrix. Glass compositions are non-reactive and chemically inert in almost every kind of acidic and otherwise corrosive environment. One notable exception is hydrofluoric acid (HF), which is known to attack and dissolve glass. The concrete composition of the present invention is not intended for use in hydrofluoric acid environments.

A variety of commercially available glass particles may be employed. Suitable recycled glass particles are available from Strategic Materials, Inc. under the trade name New Age Blast Media®. These recycled glass particles are available in a variety of sizes, including without limitation 10×20 mesh (840-2100 microns), 20×40 mesh (420-840 microns), 70 mesh (210 microns), and the like.

The glass particles should have a particle size that is suitable for casting or pumping using an aqueous slurry. The median particle size of the glass particles may range from about 0.02 mm to about 10 mm, suitably about 0.05 mm to about 5 mm. Larger or smaller particle sizes can be used, depending on the capabilities of the casting or pumping equipment and the needs of the application. When recycled glass is used, the glass particles can be prepared by pulverizing the glass to the desired particle size. The glass particles can also be manufactured using known techniques for making glass spheres and glass beads. Any combination of pulverized glass particles and original glass spheres or beads can be employed.

The chemically inert concrete composition includes, based on dry weight, about 3% to about 40% by weight colloidal silica particles, suitably about 4% to about 30% by weight colloidal silica particles. The colloidal silica particles are provided in the form of a colloidal silica dispersion that typically includes about 30-60% by weight colloidal silica particles and about 40-70% by weight water, or about 40-50% by weight colloidal silica particles and about 50-60% by weight water. The aqueous colloidal silica dispersion is mixed with the glass particles and optional additional ingredients (described below) to form an aqueous concrete slurry, which can then be applied to a substrate. When the concrete composition is dried, the colloidal silica particles serve as a binder between the glass particles and optional additional ingredients, which can be particulate or fibrous. The colloidal silica particles may have a median particle diameter of about 1 to about 100 nanometers, suitably about 4 to about 100 nanometers, or about 6 to about 50 nanometers, or about 8 to about 20 nanometers.

The chemically inert concrete composition may optionally include one or more additional ingredients selected from the group consisting of $SiO_2$, $Al_2O_3$, compounds thereof, and combinations thereof. The additional ingredients may be in any suitable form, including, for example, fused clay, flint clay, mullite, and combinations thereof, and may be in the form of particles or fibers. When present, the additional ingredients may constitute about 3% to about 40% by weight, suitably about 10% to about 35% by weight, based on the dry weight of the concrete composition. Suitable additional ingredients include fused silica fines having a median particle size of less than about 100 microns, or about 1 to about 50 microns, including without limitation PEMCO D.C. silica fines available from Precision Electro Minerals Co. Optional additional ingredients also include minor amounts (typically less than about 1% by weight, or less than about 0.5% by weight) of scale inhibitors and dispersants.

In order to ensure chemical inertness, the concrete composition should be substantially or entirely free of reactive ingredients, especially those that react in an acidic or other chemical environment. The term "substantially free" means that such reactive ingredients should constitute less than about 2.5% by weight, or less than about 1.5% by weight, or less than about 1.0% by weight, or less than about 0.5% by weight, based on the dry weight of the concrete composition. The reactive ingredients that should be minimized or excluded include without limitation Group I and Group II metal oxides exclusive (outside) of the glass particles, and common cements, such as Portland cement or white cement, that include such reactive ingredients in a form that exposes them to chemical reaction.

As explained above, many types of glass include minor amounts of Group I and Group II metal oxides that are chemically linked within the glass particles. Yet the glass particles are non-reactive in nearly all chemical environments, except for hydrofluoric acid. Thus, the substantial or total exclusion of Group I and Group II metal oxides is exclusive of the glass particles. Portland cement, white cement and other known cements generally contain Group I and/or Group II metal oxides in a reactive form. Thus, the substantial or total exclusion of Group I and Group II metal oxides applies both to the oxides in their free form, and to any composition (e.g. cement) that is outside of the glass particles and contains these oxides in a reactive form.

Prior to drying, the concrete composition includes water in an amount of about 1.0 to about 2.5 parts by weight water per part by weight of colloidal silica particles, suitably about 1.3 to about 1.7 parts by weight water per part by weight of colloidal silica particles. The concrete composition suitably contains minimal or no organic solvents or other organic compounds, either before or after drying. As with Group I and Group II metal oxides, organic solvents and compounds are less environmentally friendly and less user friendly than the remaining ingredients of the chemically inert concrete composition.

To prepare the chemically inert concrete, an aqueous colloidal dispersion of colloidal silica particles and water is prepared or otherwise provided. The colloidal silica dispersion includes about 40% to about 70% by weight water and about 30% to about 60% by weight colloidal silica particles, suitably about 50% to about 60% by weight water and about 40% to about 50% by weight colloidal silica particles. The colloidal silica dispersion is then mixed with the glass particles in amounts needed to provide a concrete composition slurry that includes, based on dry weight, about 50% to about 95% by weight glass particles and about 3% to about 40% by weight colloidal silica particles. Optional additional ingredients can also be added to the concrete composition slurry in amounts of about 3% to about 40% by weight, based on the dry weight of the composition. The optional additional ingredients should be nonreactive, and are suitably selected from $SiO_2$, $Al_2O_3$, and compounds and combinations thereof. The optional ingredients can be provided in any form or amount that is non-reactive and does not undermine the chemical inertness of the aqueous concrete composition.

The chemically inert concrete composition may be supplied as a two-part composition, in which the first part includes the aqueous colloidal silica dispersion and the second part includes the glass particles and optional additional ingredients. The two parts are then uniformly mixed together to form an aqueous concrete composition.

The aqueous concrete composition can then be applied to a substrate and dried, without heat, to form a solid chemically inert concrete object or layer. The substrate can be a mold for a concrete object or block. Alternatively, the substrate can be a flat or curved surface. The substrate can be located in an environment (excluding hydrofluoric acid) where chemical attack, moisture attack, molding or mildew could otherwise present a problem. Examples include chemical plants, oil refineries, pulp and paper plants, wastewater treatment plants, sulfur pits, and sumps, floors, roofs, drains, gutters, pipes, sewers, trenches, and other corrosive environments.

EXAMPLES

A concrete composition containing the following ingredients in the following weight percentages (based on dry weight) was prepared.

| Ingredient | Type | % By Weight |
| --- | --- | --- |
| Dry Ingredients | | |
| Glass Particles, 840-2100 microns | Soda Lime New Age Blast Media 10 × 20 | 35.0 |
| Glass Particles, 420-840 microns | Soda Lime New Age Blast Media 20 × 40 | 17.3 |
| Glass Particles, up to 210 microns | Soda Lime New Age Blast Media 70 | 11.3 |
| Glass Fines, up to 70 microns | Fused Silica PEMCO D.C. Fines | 30.4 |
| Microsilica | Elkem AS Microsilica, Grade 955 | 5.8 |
| Setting Agent | Magnesium Oxide, 98% pulverized | 0.2 |
| TOTAL | | 100 |
| Liquid Binder | | |
| Colloidal Silica | Metset 2032-S (40% solids, 60% water) | 12 parts by wt. per 100 parts by wt. dry ingredients |

The concrete composition was prepared by mixing the aqueous colloidal silica binder with the glass particles and other dry ingredients. Granular specimens having a dry weight of about 50 grams were boiled in a sulfuric acid solution using the procedure specified in ASTM C279. The specimens were rinsed, dried, and weighed again. As shown in Table 1, each of the samples experienced a very minor weight loss of less than one percent:

TABLE 1

| ASTM C279 Test Results | | | |
| --- | --- | --- | --- |
| Sample | Initial Weight (g) | Final Weight (g) | Loss (%) |
| 1 | 50.23 | 49.81 | 0.82 |
| 2 | 50.26 | 49.85 | 0.82 |

The embodiments of the invention described herein are presently preferred. Various modifications and improvements can be made without departing from the spirit and scope of the invention. The scope of the invention is defined by the appended claims. All changes that fall within the remaining and range of equivalents are intended to be embraced therein.

We claim:

1. A concrete composition, comprising based on dry weight:
   about 50% to about 95% by weight pulverized recycled glass particles; and
   about 3% to about 40% by weight colloidal silica particles;
   wherein the concrete composition is free of organic carriers and substantially free of Group I and Group II metal oxides exclusive of the glass particles, and the colloidal silica particles are provided as a colloidal silica dispersion that includes about 30-60% by weight colloidal silica particles having a median particle diameter of about 1-100 nanometers and about 40-70% by weight water.

2. The concrete composition of claim 1, wherein the concrete composition comprises less than about 1.5% by weight Group I and Group II metal oxides exclusive of the glass particles.

3. The concrete composition of claim 1, wherein the concrete composition comprises less than about 1.0% by weight Group I and Group II metal oxides exclusive of the glass particles.

4. The concrete composition of claim 1, wherein the concrete composition comprises less than about 0.5% by weight Group I and Group II metal oxides exclusive of the glass particles.

5. The concrete composition of claim 1, comprising about 60% to about 90% by weight of the glass particles and about 10% to about 30% by weight of the colloidal silica particles.

6. The concrete composition of claim 1, further comprising about 3% to about 40% by weight of one or more additional ingredients selected from the group consisting of $SiO_2$, $Al_2O_3$, compounds thereof, and combinations thereof.

7. The concrete composition of claim 6, wherein the one or more additional ingredients comprise fused silica having a median particle size of about 1 to about 50 microns.

8. The concrete composition of claim 1, wherein the glass particles have a median particle size of about 0.05 mm to about 5 mm.

9. A concrete composition, comprising based on dry weight:
   about 50% to about 95% by weight pulverized recycled glass particles;
   about 3% to about 40% by weight colloidal silica particles; and
   about 3% to about 40% by weight of one or more additional ingredients selected from the group consisting of $SiO_2$, $Al_2O_3$, compounds thereof, and combination thereof;

wherein the concrete composition is free of organic carriers and substantially free of cement, and the colloidal silica particles are provided as a colloidal silica dispersion that includes about 30-60% by weight colloidal silica particles having a median particle diameter of about 1-100 nanometers and about 40-70% by weight water.

10. The concrete composition of claim 9, wherein the concrete composition comprises less than about 2.5% by weight cement.

11. The concrete composition of claim 9, wherein the concrete composition comprises less than about 1.0% by weight cement.

12. The concrete composition of claim 9, wherein the one or more additional ingredients is selected from the group consisting of fused silica, flint clay, mullite, and combinations thereof.

13. The concrete composition of claim 9, comprising about 60% to about 90% by weight of the glass particles and about 4% to about 30% by weight of the colloidal silica particles.

14. The concrete composition of claim 13, wherein the additional ingredients comprise fused silica having a median particle size of about 1 to about 50 microns.

15. A concrete composition, comprising based on dry weight:
   about 50% to about 95% by weight pulverized recycled glass particles selected from the group consisting of soda-lime glass, lead glass, borosilicate glass, and combinations thereof; and
   about 3% to about 40% by weight colloidal silica particles;
   wherein the concrete composition is free of organic carriers and comprises less than about 1.5% by weight Group I and Group II metal oxides exclusive of the glass particles, and the colloidal silica particles are provided as a colloidal silica dispersion that includes about 30-60% by weight colloidal silica particles having a median particle diameter of about 1-100 nanometers and about 40-70% by weight water.

16. The concrete composition of claim 15, wherein the glass particles comprise soda-lime glass.

17. The concrete composition of claim 15, wherein the glass particles comprise lead glass.

18. The concrete composition of claim 15, wherein the glass particles comprise borosilicate glass.

* * * * *